(12) United States Patent
Ding et al.

(10) Patent No.: US 10,209,128 B2
(45) Date of Patent: Feb. 19, 2019

(54) LIGHT INTENSITY DETECTION CIRCUIT, LIGHT INTENSITY DETECTOR, DETECTION METHOD THEREOF AND DISPLAY DEVICE

(71) Applicant: BOE Technology Group Co., Ltd., Beijing (CN)

(72) Inventors: Xiaoliang Ding, Beijing (CN); Xue Dong, Beijing (CN); Jing Lv, Beijing (CN); Haisheng Wang, Beijing (CN); Chun Wei Wu, Beijing (CN); Yingming Liu, Beijing (CN); Wei Liu, Beijing (CN); Pengpeng Wang, Beijing (CN); Yanling Han, Beijing (CN); Xueyou Cao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/744,635

(22) PCT Filed: Aug. 2, 2017

(86) PCT No.: PCT/CN2017/095603
§ 371 (c)(1),
(2) Date: Jan. 12, 2018

(87) PCT Pub. No.: WO2018/059114
PCT Pub. Date: Apr. 5, 2018

(65) Prior Publication Data
US 2019/0003883 A1 Jan. 3, 2019

(30) Foreign Application Priority Data
Sep. 30, 2016 (CN) .......................... 2016 1 0877622

(51) Int. Cl.
*G01J 1/44* (2006.01)
*G09G 5/10* (2006.01)

(52) U.S. Cl.
CPC ......... *G01J 1/44* (2013.01); *G01J 2001/4426* (2013.01); *G09G 5/10* (2013.01); *G09G 2360/144* (2013.01)

(58) Field of Classification Search
CPC ........ G09G 2360/14; G01J 1/44; G06F 3/041; G11B 11/10595; G11B 7/1263
(Continued)

(56) References Cited

U.S. PATENT DOCUMENTS 8,223,094 B2 * 7/2012 Nakamura ........... G09G 3/3233
313/463
2009/0309009 A1 12/2009 Fann

FOREIGN PATENT DOCUMENTS

| CN | 102376245 A | 3/2012 |
| CN | 105044952 A | 11/2015 |

(Continued)

OTHER PUBLICATIONS

Nov. 1, 2017—International Search Report and Written Opinion Appn PCT/CN2017/095603 with Eng Tran.

*Primary Examiner* — Que Tan Le
(74) *Attorney, Agent, or Firm* — Banner & Witcoff, Ltd.

(57) ABSTRACT

A light intensity detection circuit, a light intensity detector, a detection method thereof and a display device are provided. The light intensity detection circuit includes a first reverser, a second reverser, a third reverser, a photosensor and an energy storage element. The first reverser respectively outputs a voltage of the first voltage terminal or the second voltage terminal to the energy storage element under the control of the signal input terminal of the light intensity detection circuit. The second reverser and the third reverser are configured to control transmission of photocurrent gen- (Continued)

erated by the photosensor along a first direction or a second direction. The energy storage element controls a voltage of the signal output terminal of the light intensity detection circuit through voltage storage or voltage release.

13 Claims, 7 Drawing Sheets

(58) Field of Classification Search
USPC .............................................. 250/205, 214 R
See application file for complete search history.

(56) References Cited

FOREIGN PATENT DOCUMENTS

| | | |
|---|---|---|
| CN | 106225924 A | 12/2016 |
| JP | 2016-127047 A | 7/2016 |

\* cited by examiner

LIGHT INTENSITY DETECTION CIRCUIT, LIGHT INTENSITY DETECTOR, DETECTION METHOD THEREOF AND DISPLAY DEVICE

The application is a U.S. National Phase entry of International Application No. PCT/CN2017/095603 filed on Aug. 2, 2017, designating the United States of America and claiming priority to Chinese Patent Application No. 201610877622.1, filed Sep. 30, 2016. The present application claims priority to and the benefit of the above-identified applications and the above-identified applications are incorporated by reference herein in their entirety.

TECHNICAL FIELD

The present disclosure relates to a light intensity detection circuit, a light intensity detector, a detection method thereof and a display device.

BACKGROUND

At present, display devices such as mobile phones and Palm computers have become one of the necessities in people's daily life. The user experience of the display device is also getting more and more attention. For example, the power consumption of the mobile phone is also constantly increased with the increase of the usage frequency of the mobile phone. Most power consumption of the mobile phone comes from the display.

Therefore, in order to solve the problem of large power consumption, the brightness of the display can be automatically adjusted according to the intensity of ambient light. For example, the brightness of the display may be increased in the case of strong ambient light and may be reduced in the case of weak ambient light, so as to achieve the objective of energy saving. More specifically, the intensity of the ambient light may be detected according to the amplitude of photocurrent signals generated by a photosensor under the action of illumination. For example, the ambient light is strong in the case of high amplitude of the generated photocurrent signals; and the ambient light is weak in the case of low amplitude of the generated photocurrent signals.

However, in the process of acquiring the amplitude of the photocurrent signals generated by the photosensor, as the amplitude is vulnerable to external interference, the anti-noise ability is poor, so the measured data accuracy is low.

SUMMARY

Embodiments of the present disclosure provide a light intensity detection circuit, a light intensity detector, a detection method thereof and a display device, which solve the problem of reduced detection accuracy due to poor anti-noise ability in the process of acquiring the amplitude of the photocurrent signals generated by the photosensor.

One embodiment of the disclosure provides a light intensity detection circuit, comprising a first reverser, a second reverser, a third reverser, a photosensor and an energy storage element, wherein the first reverser is electrically connected with a signal input terminal, a first voltage terminal, a second voltage terminal and the energy storage element of the light intensity detection circuit and configured to respectively output a voltage of the first voltage terminal or the second voltage terminal to the energy storage element under the control of the signal input terminal of the light intensity detection circuit; the second reverser is electrically connected with one end of the photosensor, the energy storage element and a ground terminal; the third reverser is electrically connected with the other end of the photosensor, a third voltage terminal and the energy storage element; the second reverser and the third reverser are configured to control transmission of photocurrent generated by the photosensor along a first direction or a second direction, in which the first direction is opposite to the second direction; and the energy storage element is further electrically connected with a signal output terminal of the light intensity detection circuit and configured to control a voltage of the signal output terminal of the light intensity detection circuit through voltage storage or voltage release.

In some examples, the first reverser includes a first transistor and a second transistor; a gate electrode of the first transistor is electrically connected with the signal input terminal of the light intensity detection circuit; a first pole is electrically connected with the first voltage terminal; a second pole is electrically connected with the energy storage element; a gate electrode of the second transistor is electrically connected with the signal input terminal of the light intensity detection circuit; a first pole is electrically connected with the second voltage terminal; a second pole is electrically connected with the energy storage element; the first transistor is a P-type transistor; and the second transistor is an N-type transistor.

In some examples, the second reverser includes a third transistor and a fourth transistor; the photosensor is a photosensitive diode; a gate electrode and a first pole of the third transistor are electrically connected with the energy storage element, and a second pole is electrically connected with an anode of the photosensitive diode; a gate electrode of the fourth transistor is electrically connected with the energy storage element; a first pole is electrically connected with the ground terminal; a second pole is electrically connected with the anode of the photosensitive diode; the third transistor is a P-type transistor; and the fourth transistor is an N-type transistor.

In some examples, the third reverser includes a fifth transistor and a sixth transistor; the photosensor is a photosensitive diode; a gate electrode and a first pole of the fifth transistor are electrically connected with the energy storage element, and a second pole is electrically connected with a cathode of the photosensitive diode; a gate electrode of the sixth transistor is electrically connected with the energy storage element; a first pole is electrically connected with the third voltage terminal; a second pole is electrically connected with the cathode of the photosensitive diode; the fifth transistor is an N-type transistor; and the sixth transistor is a P-type transistor.

In some examples, the energy storage element includes a capacitor and a resistor; one end of the capacitor is electrically connected with the signal output terminal of the light intensity detection circuit and the other end of the capacitor is electrically connected with the ground terminal; and one end of the resistor is electrically connected with the first reverser, the second reverser and the third reverser, and the other end is electrically connected with the signal output terminal of the light intensity detection circuit.

In some examples, an output voltage of the third voltage terminal is higher than an output voltage of the second voltage terminal.

Another embodiment of the disclosure provides a light intensity detector, comprising n light intensity detection circuits as mentioned above and an acquisition unit, wherein n≥1 and n is a positive integer; when n=1, the signal output terminal of the light intensity detection circuit is electrically connected with the acquisition unit, and the acquisition unit is configured to acquire a frequency of output signals of the signal output terminal of the light intensity detection circuit; or when n>1, multiple light intensity detection circuits are in cascade connection; the signal output terminal of the last light intensity detection circuit is electrically connected with the acquisition unit; and the acquisition unit is configured to acquire a frequency of output signals of the signal output terminal of the last light intensity detection circuit.

In some examples, the light intensity detector comprises n light intensity detection circuits; n≥3, and n is an odd number; and the signal output terminal of the last light intensity detection circuit is electrically connected with the signal input terminal of the first light intensity detection circuit.

In some examples, the acquisition unit includes a counter, a timer and a processor; the counter is connected with the timer and configured to count a number of the output signals of the signal output terminal of the last light intensity detection circuit; the timer is further connected with the processor and configured to record a time of the output signals of the signal output terminal of the last light intensity detection circuit according to a counting result of the counter; and the processor is configured to calculate the frequency of the output signals of the signal output terminal of the last light intensity detection circuit according to a recording result of the timer.

Another embodiment of the disclosure provides a display device, comprising the light intensity detector as mentioned above.

In some examples, the display device further includes a display panel and a shell for covering a non-display region of the display panel, wherein the light intensity detector is disposed in the non-display region; and a transparent hole is formed at a position of the shell corresponding to the light intensity detector.

Another embodiment of the disclosure provides a method for detecting light intensity via the light intensity detector as mentioned above, comprising: inputting an initial signal into the signal input terminal of the light intensity detection circuit; and determining a light intensity by adopting the acquisition unit to acquire the frequency of the output signals of the signal output terminal of the light intensity detection circuit.

In some examples, when the light intensity detector includes n light intensity detection circuits, n≥3, n being an odd number, the signal output terminal of the last light intensity detection circuit being electrically connected with the signal input terminal of the first light intensity detection circuit, the acquisition unit including a counter, a timer and a processor, adopting the acquisition unit to acquire the frequency of the output signals of the signal output terminal of the light intensity detection circuit includes: allowing the timer to start timing in a case of inputting high level into the signal input terminal of the first light intensity detection circuit for the first time, and allowing the counter to count once when the signal output terminal of the last light intensity detection circuit outputs high level; allowing the timer to stop timing when a count number of the counter reaches a default number; and allowing the processor to obtain the frequency of the output signals of the signal output terminal of the last light intensity detection circuit according to the time of the timer and the default number.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1A:
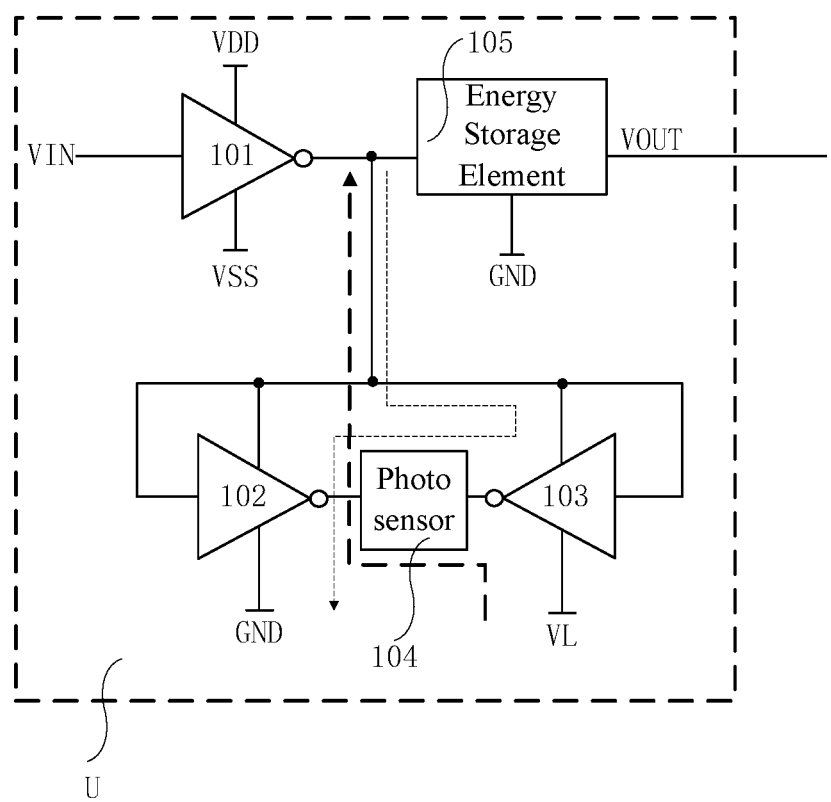
FIG. 1A is a schematic structural view of a light intensity detection circuit provided by the embodiment of the present disclosure.

The embodiment of the present disclosure provides a light intensity detection circuit U, which, as illustrated in FIG. 1A, comprises a first reverser 101, a second reverser 102, a third reverser 103, a photosensor 104 (e.g., a complementary metal oxide semiconductor (COMS) device) and an energy storage element 105.

The first reverser 101 is electrically connected with a signal input terminal VIN, a first voltage terminal VDD, a second voltage terminal VSS and the energy storage element 105 of the light intensity detection circuit U and configured to respectively output the voltage of the first voltage terminal VDD or the second voltage terminal VSS to the energy storage element 105 under the control of the signal input terminal VIN of the light intensity detection circuit U.

As described above, the first reverser 101 may control the amplitude of voltage signals inputted into the energy storage element 105 for storage. For example, when the signal input terminal VIN of the light intensity detection circuit U inputs low level, the first reverser 101 inputs high level into the energy storage element 105, and at this point, the energy storage element 105 stores the high level. Or when the signal input terminal VIN of the light intensity detection circuit U inputs high level, the first reverser 101 inputs low level into the energy storage element 105, and at this point, the energy storage element 105 releases stored voltage.

On this basis, the energy storage element 105 is also electrically connected with a signal output terminal VOUT of the light intensity detection circuit U and configured to control the voltage of the signal output terminal VOUT of the light intensity detection circuit U via voltage storage or voltage release. For example, when the first reverser 101 outputs high level to the energy storage element 105, the energy storage element 105 stores the high level and the stored high level is adopted to charge the signal output terminal VOUT of the light intensity detection circuit U. Or when the first reverser 101 outputs low level to the energy storage element 105, the voltage stored in the energy storage element 105 is released, so as to gradually pull down the potential of the signal output terminal VOUT of the light intensity detection circuit U.

In addition, the second reverser 102 is electrically connected with one end of the photosensor 104, the energy storage element 105 and a ground terminal GND. The third reverser 103 is electrically connected with the other end of the photosensor 104, a third voltage terminal VL and the energy storage element 105. The second reverser 102 and the third reverser 103 are configured to control the transmission of photocurrent I generated by the photosensor 104 along a first direction (the direction as illustrated by dotted lines in FIG. 1A) or a second direction (the direction as illustrated by bold dash lines in FIG. 1A). The first direction is opposite to the second direction.

It should be noted that description is given in the embodiment of the present disclosure by taking the case that the first voltage terminal VDD inputs high level and the second voltage terminal VSS and the third voltage terminal VL input low level as an example, in which the output voltage of the third voltage terminal VL is higher than the output voltage of the second voltage terminal VSS.

As can be seen, under the control of the output voltage of the first reverser 101, the transmission direction of the photocurrent I generated by the photosensor 104 may be determined through the second reverser 102 and the third reverser 103.

For example, when the first reverser 101 outputs high level to the energy storage element 105, the energy storage element 105 stores the high level, and at this point, under the control of the high level outputted by the first reverser 101, the second reverser 102 and the third reverser 103 may be adopted to determine the transmission of the photocurrent I generated by the photosensor 104 along the first direction (the direction as illustrated by the dotted lines in FIG. 1A). In this case, when the intensity of ambient light irradiated to the photosensor 104 is high, the photocurrent I generated by the photosensor 104 is large, so the energy storage element 105 cannot store the high level outputted by the first reverser 101 in time. Thus, the charging efficiency is reduced, so the potential pull-up rate of the signal output terminal VOUT of the light intensity detection circuit U, electrically connected with the energy storage element 105, can be slow, namely the frequency of outputting high level of the signal output terminal VOUT of the light intensity detection circuit can be low. Conversely, when the photocurrent I is small, the frequency is high.

Or when the first reverser 101 outputs low level to the energy storage element 105, the voltage stored in the energy storage element 105 is released to the second voltage terminal VSS, so as to pull down the potential of the signal output terminal VOUT of the light intensity detection circuit. At this point, under the control of the low level outputted by the first reverser 101, the second reverser 102 and the third reverser 103 may be adopted to determine the transmission of the photocurrent I generated by the photosensor 104 along a second direction (the direction as illustrated by bold lines in FIG. 1B), so the voltage of the third voltage terminal VL can charge the energy storage element 105 along the second direction. In this case, when the intensity of the ambient light irradiated to the photosensor 104 is high, the photocurrent I generated by the photosensor 104 is large, so the charging efficiency of the third voltage terminal VL on the energy storage element 105 can be improved. Thus, the efficiency of releasing the voltage in the energy storage element 105 to the second voltage terminal VSS can be reduced. In this case, the potential pull-down rate of the signal output terminal VOUT of the light intensity detection circuit, electrically connected with the energy storage element 105, can be slow, namely the frequency of outputting low level of the signal output terminal VOUT of the light intensity detection circuit can be low. Conversely, when the photocurrent I is small, the frequency is high.

As can be seen, the photocurrent I may control the charge and discharge efficiency of the energy storage element 105, so as to achieve the objective of controlling the frequency of the output signals of the signal output terminal VOUT of the light intensity detection circuit U. In summary, the embodiment of the present disclosure achieves the objective of detecting the intensity of the ambient light by detecting the frequency of the output signals of the signal output terminal VOUT of the light intensity detection circuit U. As the detection value is the frequency, the anti-noise ability is high, and the measured data accuracy is high.

Detailed description will be given below to the specific structure and connecting modes of components in the light intensity detection circuit U.

Figure 1B:
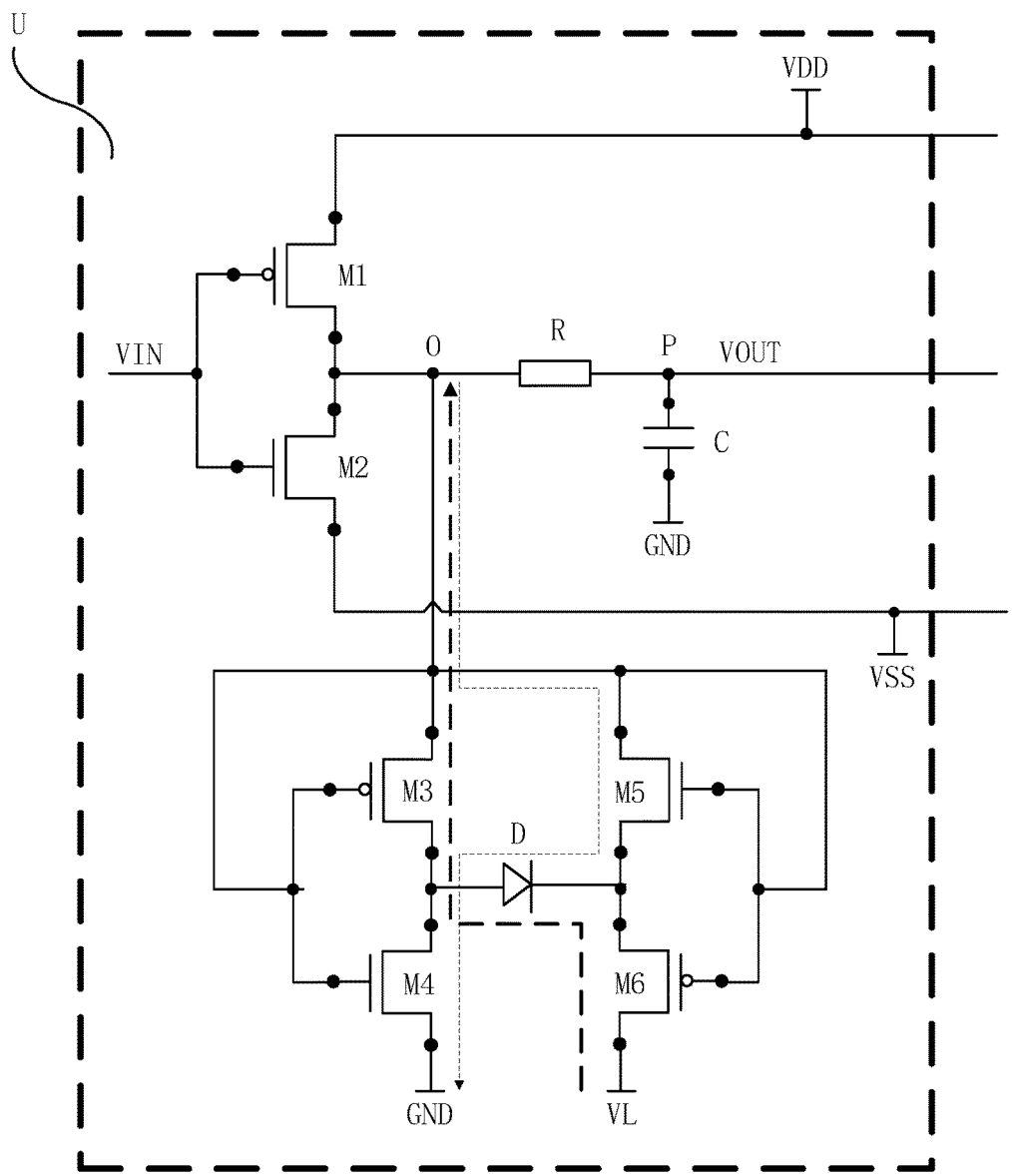
FIG. 1B is a specific schematic structural view of the light intensity detection circuit in FIG. 1A.

For example, as illustrated in FIG. 1B, the first reverser 101 includes a first transistor M1 and a second transistor M2.

A gate electrode of the first transistor M1 is electrically connected with the signal input terminal VIN of the light intensity detection circuit U; a first pole is electrically connected with the first voltage terminal VDD; and a second pole is electrically connected with the energy storage element 105.

A gate electrode of the second transistor M2 is electrically connected with the signal input terminal VIN of the light intensity detection circuit U; a first pole is electrically connected with the second voltage terminal VSS; and a second pole is electrically connected with the energy storage element 105.

The first transistor M1 is a P-type transistor and the second transistor M2 is an N-type transistor. In this case, when the signal input terminal VIN of the light intensity detection circuit U inputs high level, the second transistor M2 is switched on and the first transistor M1 is switched off. When the signal input terminal VIN of the light intensity detection circuit U inputs low level, the second transistor M2 is switched off and the first transistor M1 is switched on.

In addition, the second reverser 102 includes a third reverser M3 and a fourth reverser M4. When the photosensor 104 is a photosensitive diode D, a gate electrode and a first pole of the third transistor M3 are electrically connected with the energy storage element 105, and a second pole is electrically connected with an anode of the photosensitive diode D. A gate electrode of the fourth transistor M4 is electrically connected with the energy storage element 105;

a first pole is electrically connected with the ground terminal GND; and a second pole is electrically connected with the anode of the photosensitive diode D.

The third transistor M3 is a P-type transistor and the fourth transistor M4 is an N-type transistor. In this case, when the first reverser 101 outputs high level to the energy storage element 105, namely the potential of a node O is pulled up, the third transistor M3 is switched off and the fourth transistor M4 is switched on. When the first reverser 101 outputs low level to the energy storage element 105, namely the potential of the node O is pulled down, the third transistor M3 is switched on and the fourth transistor M4 is switched off.

On this basis, the third reverser 103 includes a fifth transistor M5 and a sixth transistor M6. When the photosensor is a photosensitive diode D, a gate electrode and a first pole of the fifth transistor M5 are electrically connected with the energy storage element 105, and a second pole is electrically connected with a cathode of the photosensitive diode D. A gate electrode of the sixth transistor M6 is electrically connected with the energy storage element 105; a first pole is electrically connected with the third voltage terminal VL; and a second pole is electrically connected with the cathode of the photosensitive diode D.

The fifth transistor M5 is an N-type transistor and the sixth transistor M6 is a P-type transistor. In this case, when the first reverser 101 outputs high level to the energy storage element 105, namely the potential of the node O is pulled up, the fifth transistor M5 is switched on and the sixth transistor M6 is switched off. When the first reverser 101 outputs low level to the energy storage element 105, namely the potential of the node O is pulled down, the fifth transistor M5 is switched off and the sixth transistor M6 is switched on.

It should be noted that the first pole of the transistor is a source electrode and the second pole is a drain electrode; or the first pole is a drain electrode and the second pole is a source electrode. No limitation will be given here in the present disclosure.

In addition, as the light intensity detection circuit U not only comprises N-type transistors but also comprises P-type transistors, the N-type transistors and the P-type transistors may be simultaneously manufactured by low temperature polysilicon (LTPS) technology.

On this basis, the energy storage element 105 may include a capacitor C and a resistor R. One end of the capacitor C is electrically connected with the signal output terminal VOUT of the light intensity detection circuit U and the other end is electrically connected with the ground terminal GND.

One end of the resistor R is electrically connected with the first reverser 101, the second reverser 102 and the third reverser 103, and the other end is electrically connected with the signal output terminal of the light intensity detection circuit U. When the structures of the first reverser 101, the second reverser 102 and the third reverser 103 are as described above, one end of the resistor R is electrically connected with the second pole of the first transistor M1, the second pole of the second transistor M2, the gate electrode and the first pole of the third transistor M3, the gate electrode of the fourth transistor M4, the gate electrode and the first pole of the fifth transistor M5, and the gate electrode of the sixth transistor M6.

Figure 2:
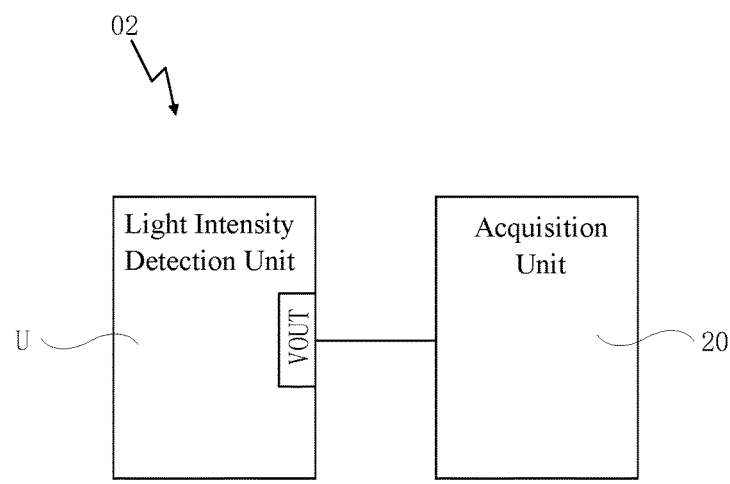
FIG. 2 is a schematic structural view of a light intensity detector provided by the embodiment of the present disclosure.
Figure 3:
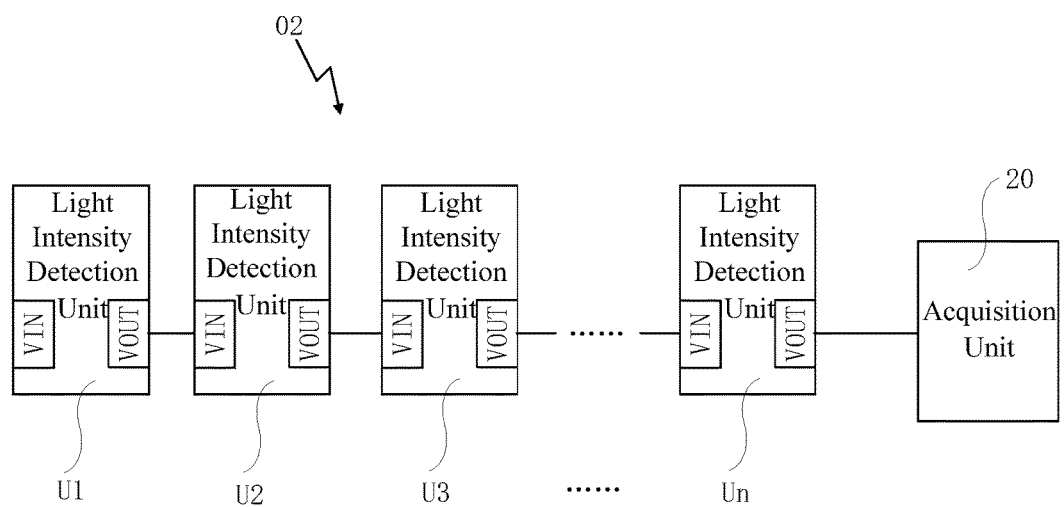
FIG. 3 is another schematic structural view of the light intensity detector in FIG. 2.

The embodiment of the present disclosure provides a light intensity detector, which, as illustrated in FIG. 2 or 3, comprises n foregoing light intensity detection circuits 02 and an acquisition unit 20, wherein n≥1 and n is a positive integer.

For example, as illustrated in FIG. 2, when n=1, the signal output terminal VOUT of the light intensity detection circuit U may be electrically connected with the acquisition unit 20. The acquisition unit 20 is configured to acquire the frequency of the output signals of the signal output terminal VOUT of the light intensity detection circuit U.

Figure 4:
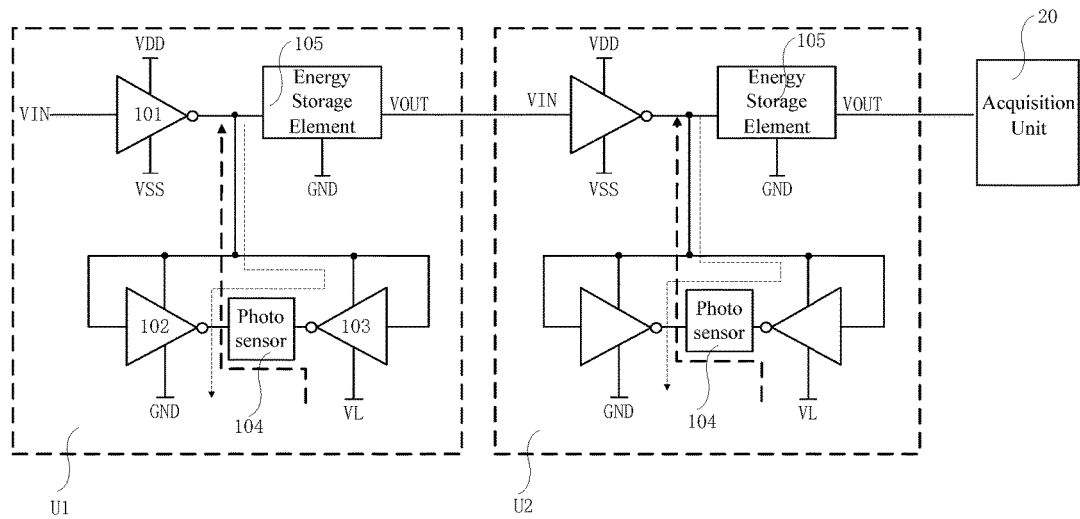
FIG. 4 is a specific schematic structural view of the light intensity detection circuit in FIG. 3.

Or moreover, for example, as illustrated in FIG. 3 or 4, when n>1, the plurality of light intensity detection circuits (U1, U2, U3 . . . Un) are in cascade connection, and the signal output terminal VOUT of the last light intensity detection circuit Un is electrically connected with the acquisition unit 20. The acquisition unit 20 is configured to acquire the frequency of the output signals of the signal output terminal VOUT of the last light intensity detection circuit U.

It should be noted that the cascade connection of the plurality of light intensity detection circuits (U1, U2, U3 . . . Un) refers to that: except for the first light intensity detection circuit U1, the signal output terminal VOUT of the previous light intensity detection circuit is electrically connected with the signal input terminal VIN of the next light intensity detection circuit. The signal input terminal VIN of the first light intensity detection circuit U1 receives input signals.

Figure 5:
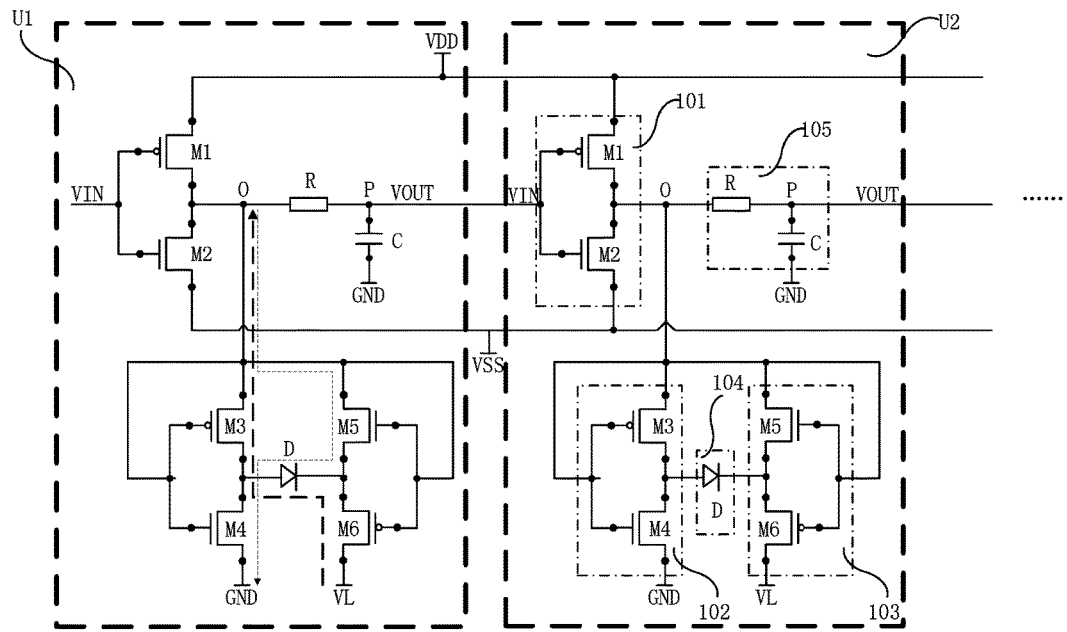
FIG. 5 is a specific schematic structural view of components of the light intensity detection circuit in FIG. 4.

Detailed description will be given below to the specific working process of the light intensity detector by taking the case that the light intensity detector as illustrated in FIG. 5 comprises a plurality of cascaded light intensity detection circuits as an example.

When the signal input terminal VIN of the first light intensity detection circuit U1 inputs low level, the first transistor M1 is switched on and the high level of the first voltage terminal VDD is outputted to the node O. The capacitor C in the energy storage element 105 stores the high level of the node O and charges the signal output terminal VOUT of the first light intensity detection circuit U1, so that the potential of a node P can be gradually pulled up.

At this point, under the control of the high level of the node O, the fifth transistor M5 and the fourth transistor M4 are switched on, so that the anode of the photosensitive diode D can be electrically connected with the ground terminal GND and the cathode can be electrically connected with the node O. In this case, the photosensitive diode D is in the reverse biased state, and the photocurrent I generated by the photosensitive diode D under the action of illumination is transmitted along a first direction (the direction as illustrated by dotted lines in FIG. 5).

Figure 6A:
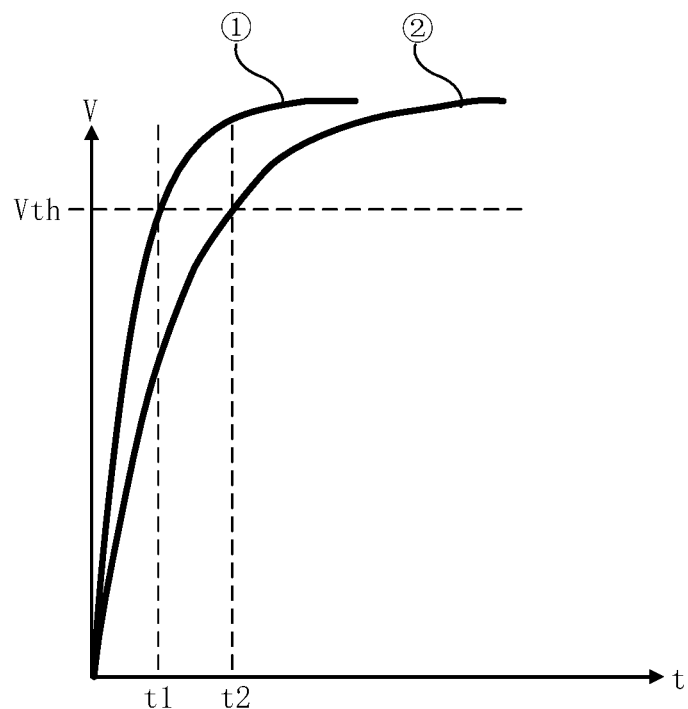
FIG. 6A is a relationship diagram illustrating the potential pull-up of photocurrent generated by a photosensitive diode and a signal output terminal of the light intensity detection circuit in FIG. 5.

In this case, when the intensity of ambient light irradiated to the photosensitive diode D is high, the photocurrent I generated by the photosensitive diode D is large, so the capacitor C cannot store the high level at the node O in time. Thus, the charging efficiency is reduced, so the potential pull-up rate of the signal output terminal VOUT (namely the node P) of the first light intensity detection circuit U1 electrically connected with the capacitor C can be slow. For example, as illustrated in FIG. 6A, the potential pull-up curve of the node P is as illustrated by the curve ②, and the threshold voltage Vth of the second transistor M2 in the second light intensity detection circuit U2 can be only reached at the t2 moment. At this point, the frequency of the output signals of the signal output terminal VOUT of the first light intensity detection circuit U1, detected by the acquisition unit 20, is low. Conversely, when the photocurrent I is small, the potential pull-up curve of the node P is as illustrated by the curve ①, and the threshold voltage Vth of the second transistor M2 in the second light intensity detection circuit U2 is reached at the t1 moment (less than the t2 moment). At this point, the frequency of the output signals of the signal output terminal VOUT of the first light intensity detection circuit U1, detected by the acquisition unit 20, is high.

As can be seen, the voltage of the first voltage terminal VDD gradually charges the signal output terminal VOUT of the first light intensity detection circuit U1 through the capacitor C, and the second transistor M2 is switched on only when the potential of the signal output terminal VOUT of the first light intensity detection circuit U1 is pulled up to the threshold voltage Vth of the second transistor M2 in the second light intensity detection circuit U2. Thus, the value of the first voltage terminal VDD is set to allow the second transistor M2 in the second light intensity detection circuit U2 to be switched on. For example, the first voltage terminal VDD, the threshold voltage Vth of the second transistor M2 in the second light intensity detection circuit U2, and the second voltage terminal VSS satisfy the following relation: VDD>VSS+Vth.

Or when the signal input terminal VIN of the first light intensity detection circuit U1 inputs high level, the second transistor M2 is switched on and the low level of the second voltage terminal VSS is outputted to the node O. The capacitor C of the energy storage element 105 releases the stored voltage to the second voltage terminal VSS, so as to gradually pull down the potential of the signal output terminal VOUT (namely the node P) of the first light intensity detection circuit U1 in the discharge process.

At this point, under the control of the low level of the node O, the third transistor M3 and the sixth transistor M6 are switched on, so that the anode of the photosensitive diode D can be electrically connected with the node O and the cathode can be electrically connected with the third voltage terminal VL. As the voltage of the third voltage terminal VL is higher than the voltage of the second voltage terminal VSS, the anode voltage of the photosensitive diode D is lower than the cathode voltage, so the photosensitive diode D is in the reverse biased state. In this case, the photocurrent I generated by the photosensitive diode D under the action of illumination is transmitted along a second direction (the direction as illustrated by bold dash lines in FIG. 5), and the voltage of the third voltage terminal VL charges the capacitor C through the sixth transistor M6, the photosensitive diode D and the third transistor M3.

Figure 6B:
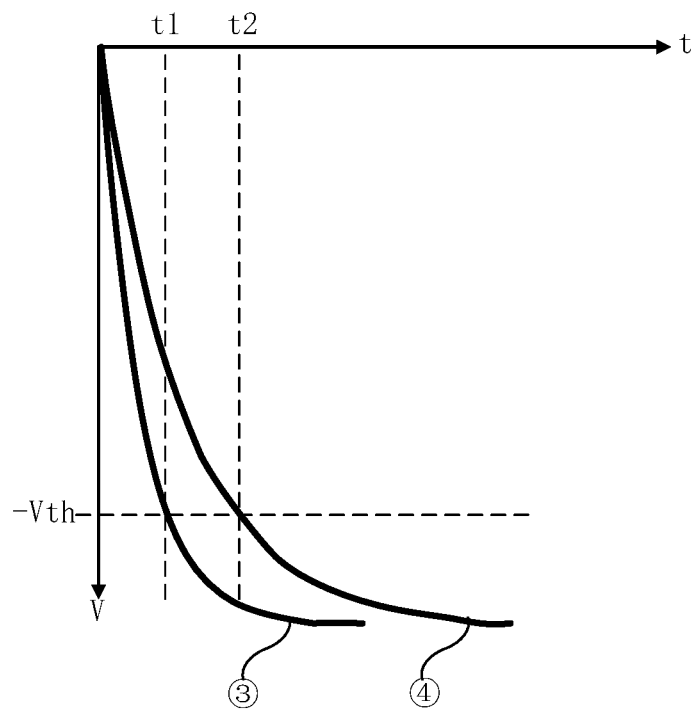
FIG. 6B is a relationship diagram illustrating the potential pull-down of the photocurrent generated by the photosensitive diode and the signal output terminal of the light intensity detection circuit in FIG. 5.

In this case, when the intensity of the ambient light irradiated to the photosensor 104 is high, the photocurrent I generated by the photosensitive diode D is large, so the charging efficiency of the third transistor M3 on the capacitor C can be improved. Thus, the efficiency of releasing the voltage stored in the capacitor C to the second voltage terminal VSS can be reduced, and finally, the potential pull-down rate of the signal output terminal VOUT (namely the node P) of the first light intensity detection circuit U1, electrically connected with the capacitor C, can be slow, and hence the potential reduction speed can be slow. At this point, as illustrated in FIG. 6B, the potential pull-down curve of the node P is as illustrated by the curve ④, and the threshold voltage Vth of the first transistor M1 in the second light intensity detection circuit U2 can be only reached at the t2 moment, so the second light intensity detection circuit U2 can be only started after a long period of time. As the first transistor M1 is a P-type transistor, the threshold voltage Vth is a negative value, so the direction of the threshold voltage Vth in FIG. 6B is downward and opposite to the direction of the threshold voltage Vth in FIG. 6A. At this point, the frequency of the output signals of the signal output terminal VOUT of the first light intensity detection circuit U1, detected by the acquisition unit 20, is low. Conversely, when the photocurrent I is small, the potential pull-down speed of the node P is fast, so the pull-down curve is as illustrated by the curve ③, and the threshold voltage Vth of the first transistor M1 in the second light intensity detection circuit U2 is reached at the t1 moment (less than the t2 moment). Thus, the second light intensity detection circuit U2 can be started after a short period of time. At this point, the frequency of the output signals of the signal output terminal VOUT of the first light intensity detection circuit U1, detected by the acquisition unit 20, is high.

As can be seen, the voltage of the second voltage terminal VSS gradually pulls down the potential of the signal output terminal VOUT of the first light intensity detection circuit U1, and the first transistor M1 is switched on only when the potential of the signal output terminal VOUT of the first light intensity detection circuit U1 is pulled down to the threshold voltage Vth of the first transistor M1 in the second light intensity detection circuit U2. Thus, the value of the second voltage terminal VSS is set to allow the first transistor M1 in the second light intensity detection circuit U2 to be switched on. For example, the second voltage terminal VSS, the threshold voltage Vth of the first transistor M1 in the second light intensity detection circuit U2, and the first voltage terminal VDD satisfy the following relation: VSS<VDD+Vth.

In summary, the intensity of the light received by the photosensitive diode D in the first light intensity detection circuit U1 can be obtained by adoption of the acquisition unit 20 to detect the frequency of the output signals of the signal output terminal VOUT of the first light intensity detection circuit U1.

However, when the acquisition unit 20 is adopted to only detect the frequency of the output signals of the signal output terminal VOUT of one light intensity detection circuit U, as the potential change of the node P in a short time is not obvious, the acquisition accuracy of the acquisition unit 20 is required to be high, so the acquisition difficulty can be improved. In addition, in the process of detecting the frequency of the output signals of the signal output terminals VOUT of even number cascaded light intensity detection circuits, when the signal input terminal VIN of the first light intensity detection circuit U1 inputs low level, the signal output terminal VOUT of the last light intensity detection circuit Un will also output low level. At this point, when the signal output terminal VOUT of the last light intensity detection circuit Un is electrically connected with the signal input terminal VIN of the first light intensity detection circuit U1, the signal input terminal VIN of the first light intensity detection circuit U1 still receives low level. In this case, the signal output terminal VOUT of the last light intensity detection circuit Un will always output low level, so the sampling period cannot be determined and the signal output frequency cannot be calculated according of the sampling period by adoption of the acquisition unit 20 to acquire the output signals of the signal output terminal VOUT of the last light intensity detection circuit Un.

Figure 7:
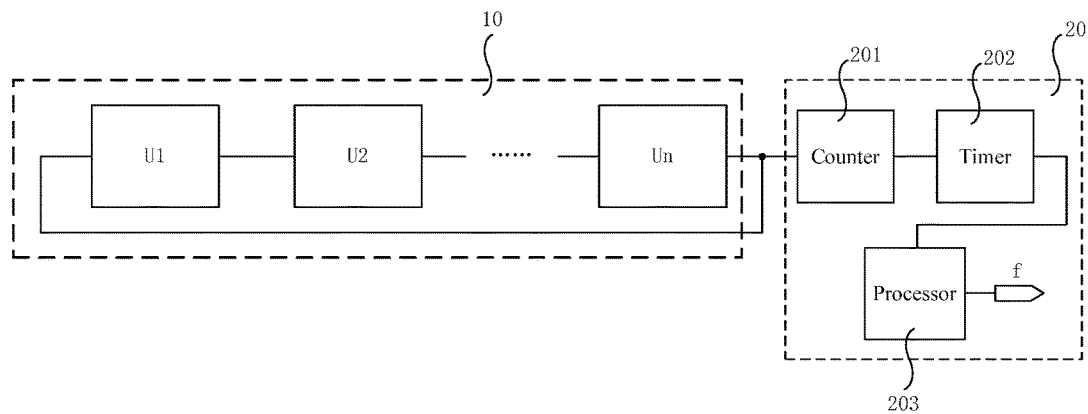
FIG. 7 is a schematic structural view of another light intensity detector provided by the embodiment of the present disclosure.

In order to solve the above problem, as illustrated in FIG. 7, the light intensity detector 02 comprises n light intensity detection circuits (U1, U2 . . . Un); n≥3, and n is an odd number; and the signal output terminal VOUT of the last light intensity detection circuit Un is electrically connected with the signal input terminal VIN of the first light intensity detection circuit U1. In this case, the acquisition unit 20 may include a counter 201, a timer 202 and a processor 203.

The counter 201 is connected with the timer 202 and configured to count the number of the output signals of the signal output terminal VOUT of the light intensity detection circuit U.

For example, as the light intensity detector 02 comprises odd number light intensity detection circuits U, when the signal input terminal VIN of the first light intensity detection circuit U1 inputs high level, the signal output terminal VOUT of the last light intensity detection circuit Un outputs low level. As the signal output terminal VOUT of the last light intensity detection circuit Un is electrically connected with the signal input terminal VIN of the first light intensity detection circuit U1, the signal input terminal VIN of the first light intensity detection circuit U1 will input low level. At this point, the signal output terminal VOUT of the last light intensity detection circuit Un outputs high level. On this basis, when the signal output terminal VOUT of the last light intensity detection circuit Un outputs high level, the counter 201 counts once, so as to determine one sampling period.

In addition, the timer 202 is connected with the processor 201 and may record the period T of oscillating signals outputted by the signal output terminal VOUT of the light intensity detection circuit U according to the counting result of the counter 201.

For example, in the process of inputting high level into the signal input terminal VIN of the first light intensity detection circuit U1 for the first time, the timer 202 starts timing; and when the count number of the counter 201 reaches default number, the timer 202 stops timing. The default number is greater than or equal to 1 and may be set as required, as long as the default number is guaranteed to be greater than or equal to 1. When the default number is set to be large, the time T recorded by the timer 202 is longer. Conversely, the time T recorded by the timer 202 is shorter.

Description is given to the process of determining the sampling period and calculating the signal output frequency via the acquisition unit 20 by taking the case that the number of the light intensity detection circuits is n=3, namely the light intensity detector 02 comprises light intensity detection circuits U1, U2 and U3, as an example.

For example, as the light intensity detection circuits U1, U2 and U3 in the light intensity detector 02 are in cascade connection, and the first light intensity detection circuit U1 is in end-to-end connection with the last light intensity detection circuit U3, the plurality of cascaded light intensity detection circuits (U1, U2 and U3) form an oscillating circuit. In this case, when the oscillating circuit receives an external interference signal or an initial signal is provided for the oscillating circuit, so that the signal input terminal VIN of the first light intensity detection circuit U1 can input low level, the oscillating circuit starts and enters the cyclic working state, so that the last light intensity detection circuit U3 can output oscillating signals. The acquisition unit 20 acquires the period T of the oscillating signals outputted by the last light intensity detection circuit U3.

Figure 9:
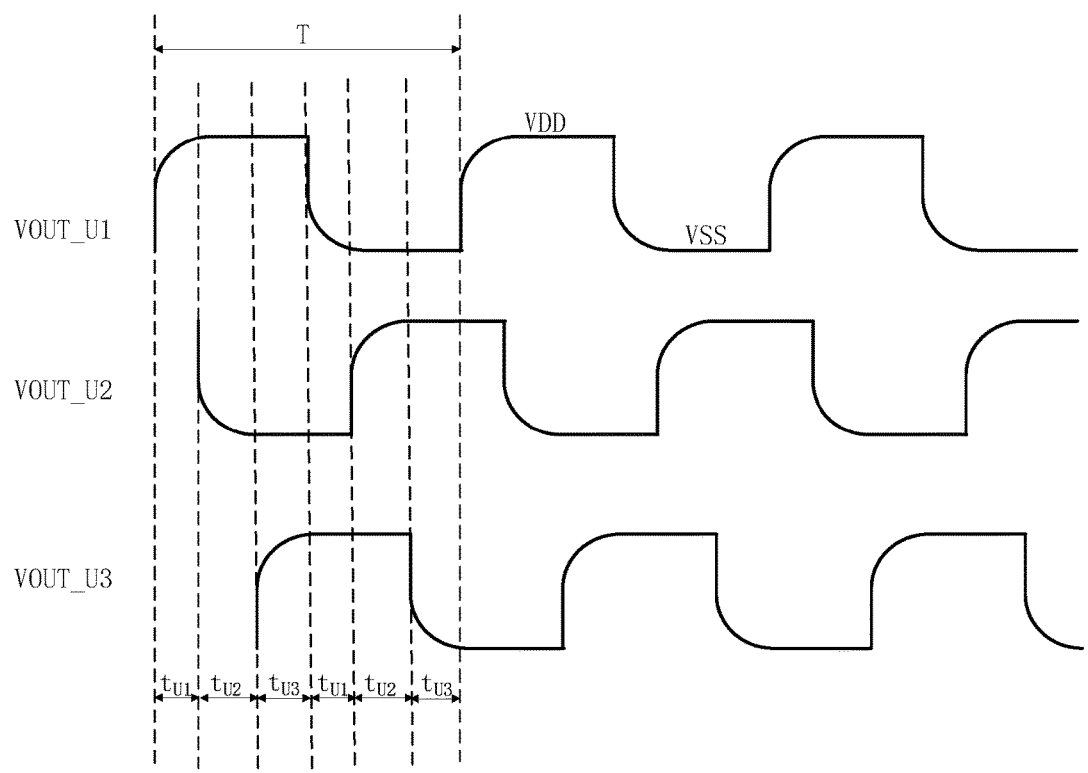
FIG. 9 is a timing diagram of output signals of signal output terminals of light intensity detection circuits in the light intensity detector.

Description will be given below to the composition of the period T of the oscillating signals. As illustrated in FIG. 9, the period of the oscillating signals is $T=2(t_{u1}+t_{u2}+t_{u3})$. When the oscillating circuit is started, the signal input terminal VIN of the first light intensity detection circuit U1 receives low level, and the signal outputted by the signal output terminal VOUT_U1 of the first light intensity detection circuit U1 is gradually pulled up to the voltage of the first voltage terminal VDD at the $t_{u1}$ moment (the t1 or t2 moment in FIG. 6A); and when the signal outputted by the signal output terminal VOUT_U1 of the first light intensity detection circuit U1 reaches the voltage value of the first voltage terminal VDD, the second light intensity detection circuit U2 starts working.

Subsequently, the signal outputted by the signal output terminal VOUT_U2 of the second light intensity detection circuit U2 is gradually pulled down to the voltage of the second voltage terminal VSS at the $t_{u2}$ moment (the t1 or t2 moment in FIG. 6B). When the signal outputted by the signal output terminal VOUT_U2 of the second light intensity detection circuit U2 reaches the voltage value of the second voltage terminal VSS, the last light intensity detection circuit U3 starts working.

Subsequently, the signal outputted by the signal output terminal VOUT_U3 of the last light intensity detection circuit U3 is gradually pulled up to the voltage of the first voltage terminal VDD at the $t_{u3}$ moment (the t1 or t2 moment in FIG. 6A). When signal outputted by the signal output terminal VOUT_U3 of the last light intensity detection circuit U3 reaches the voltage value of the first voltage terminal VDD, the signal input terminal VIN of the first light intensity detection circuit U1 receives the high level outputted by the signal output terminal VOUT_U3 of the last light intensity detection circuit U3.

Subsequently, the signal outputted by the signal output terminal VOUT_U1 of the first light intensity detection circuit U1 is gradually pulled down to the voltage of the second voltage terminal VSS at the $t_{u1}$ moment (the t1 or t2 moment in FIG. 6B). When the signal outputted by the signal output terminal VOUT_U1 of the first light intensity detection circuit U1 reaches the voltage value of the second voltage terminal VSS, the second light intensity detection circuit U2 starts working. Subsequently, the working processes of the second light intensity detection circuit U2 and the last light intensity detection circuit U3 are the same as above, so the period of the oscillating signals outputted by the signal output terminal VOUT_U3 of the last light intensity detection circuit U3 is $T=2(t_{u1}+t_{u2}+t_{u3})$.

Subsequently, the oscillating circuit cycles the above period T, so that the signal output terminal VOUT_U3 of the last light intensity detection circuit U3 can continuously output the oscillating signals.

It should be noted that the $t_{u1}$ moment, the $t_{u2}$ moment and the $t_{u3}$ moment are the same with the t1 or t2 moment as illustrated in FIG. 6A or 6B and are all determined by the photocurrent detected by the light intensity detection circuits.

Of course, description is given above by taking the case that the light intensity detector 02 comprises three light intensity detection circuits as an example. When the light intensity detector 02 comprises odd number (more than three) light intensity detection signals, the acquisition process of the period T of the oscillating signals outputted by the signal output terminal VOUT of the last light intensity detection circuit is the same as above, so no further description will be given here.

On this basis, the processor 203 may calculate the frequency f of the output signals of the signal output terminal VOUT of the last light intensity detection circuit according to the recording result (namely the recorded time T) of the timer 202.

For example, $f=1/T=1/(2n(t+k))$.

Wherein, f refers to the frequency of the output signals of the signal output terminal VOUT of the last light intensity detection circuit Un; and T refers to the time recorded by the timer 202, namely the period T of the oscillating signals outputted by the signal output terminal VOUT of the last light intensity detection circuit.

And t refers to the potential pull-up or pull-down time of the signal output terminals VOUT of the light intensity detection circuits in the light intensity detector 02. As described above, as illustrated in FIG. 6A, when the intensity of light incident into the light intensity detector is higher, t is longer (e.g., t2) and f is lower; and when the intensity of the light incident into the light intensity detector is lower, t is shorter (e.g., t1) and f is higher.

In addition, n refers to the number of the light intensity detection circuits in one light intensity detector 02.

Moreover, k is a constant relevant to the characteristics of the capacitor C, the resistor R and the transistors.

In summary, the present disclosure can obtain the intensity of the light incident into the light intensity detector through the potential pull-up rate of the signal output terminal VOUT of the light intensity detection circuit U, namely the frequency of the output signals thereof.

The embodiment of the present disclosure provides a display device, which comprises any foregoing light intensity detector and has the structures and the advantages the same with those of the light intensity detector provided by the foregoing embodiment. As detailed description has been given in the above embodiment to the structure and the advantages of the light intensity detector, no further description will be given here.

Figure 8:
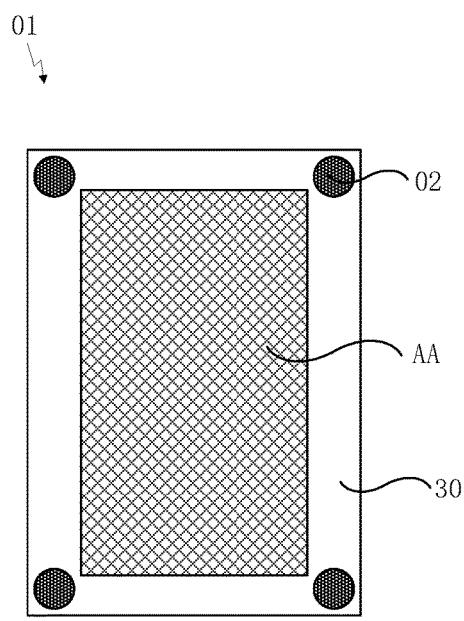
FIG. 8 is a schematic structural view of a display device provided by the embodiment of the present disclosure.

Moreover, the display device further comprises a display panel 01 as illustrated in FIG. 8 and a shell (not illustrated in the figure) for covering a non-display region 30 of the display panel 01. The non-display region 30 is disposed at the periphery of an active area (AA) and configured to arrange a gate driver on array (GOA) circuit and the remaining driving members.

In this case, in order to not affect the display effect, the light intensity detector 02 may be disposed in the non-display region 30; and for the irradiation of the ambient light to the light intensity detector 02, a transparent hole (not illustrated in the figure) may be formed at a position of the shell corresponding to the light intensity detector 30.

For example, one light intensity detector 30 may be respectively disposed at four corners of the non-display region 30, or in order to further improve the detection accuracy, a plurality of light intensity detectors 30 may be disposed at each corner. No limitation will be given here in the present disclosure.

The embodiment of the present disclosure provides a method for detecting the light intensity by adoption of any foregoing light intensity detector. The method comprises:

Firstly, an initial signal is inputted into the signal input terminal VIN of the light intensity detection circuit U as illustrated in FIG. 1A.

It should be noted that: when the structure of the light intensity detection circuit U is as illustrated in FIG. 1B, the amplitude of the initial signal must be greater than or equal to the amplitude of the threshold voltage Vth of the first transistor M1 or the second transistor M2.

For example, low level is inputted into the signal input terminal VIN of the light intensity detection circuit U as illustrated in FIG. 1A; the first reverser 101 outputs the voltage of the first voltage terminal VDD to the energy storage element 105 under the control of the signal input terminal VIN of the light intensity detection circuit U; and the energy storage element 105 stores the voltage of the first voltage terminal and charges the signal output terminal VOUT of the light intensity detection circuit U.

For example, when the structure of the light intensity detection circuit U is as illustrated in FIG. 5, the above step is as follows: when the signal input terminal VIN of the first light intensity detection circuit U1 inputs low level, the first transistor M1 is switched on and the high level of the first voltage terminal VDD is outputted to the node O. The capacitor C in the energy storage element 105 will store the high level of the node O and charges the signal output terminal VOUT (namely the node P) of the first light intensity detection circuit U1, so as to gradually pull up the potential of the node P.

Secondly, under the control of the output signal of the first reverser 101, the second reverser 102 and the third reverser 103 determine the transmission of the photocurrent I generated by the photosensor 104 along the first direction (the direction as illustrated by the dotted lines in FIG. 1A).

For example, under the control of the high level of the node O, the fifth transistor M5 and the fourth transistor M4 are switched on, so that the anode of the photosensitive diode D can be electrically connected with the ground terminal GND and the cathode can be electrically connected with the node O. At this point, the photosensitive diode D is in the reverser biased state, and the photocurrent I generated by the photosensitive diode D under the action of illumination is transmitted along the first direction (the direction as illustrated by the dotted lines in FIG. 5).

Finally, the acquisition unit 20 acquires the frequency of the output signals of the signal output terminal VOUT of the light intensity detection circuit U. The frequency of the output signals of the signal output terminal VOUT of the light intensity detection circuit U is inversely proportional to the photocurrent I.

For example, when the intensity of the ambient light irradiated to the photosensitive diode D is high, the photocurrent I generated by the photosensitive diode D is large, so the capacitor C cannot store the high level at the node O in time. Thus, the charging efficiency is reduced, so the potential pull-up rate of the signal output terminal VOUT (namely the node P) of the first light intensity detection circuit U1, electrically connected with the capacitor C, can be slow. For example, as illustrated in FIG. 6A, the potential pull-up curve of the node P is as illustrated by the curve ②, and the threshold voltage Vth of the second transistor M2 in the second light intensity detection circuit can be only reached at the t2 moment. At this point, the frequency of the output signals of the signal output terminal VOUT of the first light intensity detection circuit U1, detected by the acquisition unit 20, is low. Conversely, when the photocurrent I is small, the potential pull-up curve of the node P is as illustrated by the curve ①, and the threshold voltage Vth of the second transistor M2 in the second light intensity detection circuit U2 is reached at the t1 moment (less than the t2 moment). At this point, the frequency of the output signals of the signal output terminal VOUT of the first light intensity detection circuit U1, detected by the acquisition unit 20, is high.

Or firstly, as illustrated in FIG. 1A, when the signal input terminal VIN of the light intensity detection circuit U inputs high level, the first reverser 101 outputs the voltage of the second voltage terminal VSS to the energy storage element 105 under the control of the signal input terminal VIN of the light intensity detection circuit U, and the energy storage element 105 releases the stored voltage, so as to pull down the potential of the signal output terminal VOUT of the light intensity detection circuit U.

For example, when the structure of the light intensity detection circuit U is as illustrated in FIG. 5, the above step is as follows: when the signal input terminal VIN of the first light intensity detection circuit U1 inputs high level, the second transistor M2 is switched on and the low level of the second voltage terminal VSS is outputted to the node O. The capacitor C in the energy storage element 105 releases the stored voltage to the second voltage terminal VSS, so as to gradually pull down the potential of the signal output terminal VOUT (namely the node P) of the first light intensity detection circuit U1 in the discharge process.

Secondly, under the control of the output signal of the first reverser 101, the second reverser 102 and the third reverser 103 determine the transmission of the photocurrent I generated by the photosensor 104 along the second direction (as illustrated by the bold dash lines in FIG. 1A), in which the first direction is opposite to the second direction.

For example, under the control of the low level of the node O, the third transistor M3 and the sixth transistor M6 are switched on, so that the anode of the photosensitive diode D can be electrically connected with the node O and the cathode can be electrically connected with the third voltage terminal VL. As the voltage of the third voltage terminal VL is greater than the voltage of the second voltage terminal VSS, the anode voltage of the photosensitive diode D is less than the cathode voltage, so the photosensitive diode D is in the reverse biased state. At this point, the photocurrent I generated by the photosensitive diode D under the action of illumination is transmitted along the second direction (the direction as illustrated by the bold dash lines in FIG. 5), and the voltage of the third voltage terminal VL charges the capacitor C through the sixth transistor M6, the photosensitive diode D and the third transistor M3.

Finally, the acquisition unit 20 acquires the frequency of the output signals of the signal output terminal VOUT of the light intensity detection circuit U, so as to determine the light intensity.

Wherein, the frequency of the output signals of the signal output terminal VOUT of the light intensity detection circuit U is inversely proportional to the photocurrent I.

For example, when the intensity of the ambient light irradiated to the photosensor 104 is high, the photocurrent I generated by the photosensitive diode D is large, so the charging efficiency of the third transistor M3 on the capacitor C is improved. Thus, the efficiency of releasing the voltage stored in the capacitor C to the second voltage terminal VSS is reduced, and finally the potential pull-down rate of the signal output terminal VOUT (namely the node P) of the first light intensity detection circuit U1, electrically connected with the capacitor C, is slow, and hence the potential reduction speed is slow. At this point, as illustrated in FIG. 6B, the potential pull-down curve of the node P is as illustrated by the curve ④, and the threshold voltage Vth of the first transistor M1 in the second light intensity detection circuit U2 can be only reached at the t2 moment, so the second light intensity detection circuit U2 can be only started after a long period of time. Wherein, as the first transistor M1 is a P-type transistor, the threshold voltage Vth is a negative value, so the direction of the threshold voltage Vth in FIG. 6B is downward and opposite to the direction of the threshold voltage Vth in FIG. 6A. At this point, the frequency of the output signals of the signal output terminal VOUT of the first light intensity detection circuit U1, detected by the acquisition unit 20, is low. Conversely, when the photocurrent I is small, the potential pull-down rate of the node P is fast, so the pull-down curve is as illustrated by the curve ⓪, and the threshold voltage Vth of the first transistor M1 in the second light intensity detection circuit U2 is reached at the t1 moment (less than the t2 moment). Thus, the second light intensity detection circuit U2 can be started after a short period of time. At this point, the frequency of the output signals of the signal output terminal VOUT of the first light intensity detection circuit U1, detected by the acquisition unit 20, is high.

In summary, the intensity of the light received by the photosensitive diode D in the first light intensity detection circuit U1 can be obtained by adoption of the acquisition unit 20 to detect the frequency of the output signals of the signal output terminal VOUT of the first light intensity detection circuit U1. On this basis, the method for detecting the light intensity via the light intensity detector, provided by the embodiment of the present disclosure, achieves the objective of detecting the intensity of the ambient light by detecting the frequency of the output signals of the signal output terminal VOUT of the light intensity detection circuit U in the light intensity detector. As the detection value is the frequency, the anti-noise ability is high, and the measured data accuracy is high.

However, when the acquisition unit 20 only detects the frequency of the output signals of the signal output terminal VOUT of one light intensity detection circuit U, as the potential change of the node P in a short time is not obvious, the acquisition accuracy of the acquisition unit 20 is required to be high, so the acquisition difficulty can be improved. In addition, in the process of detecting the frequency of the output signals of the signal output terminal VOUT of the light intensity detection circuit U among even number cascaded light intensity detection circuits, when the signal input terminal VIN of the first light intensity detection circuit U1 inputs low level, the signal output terminal VOUT of the last light intensity detection circuit Un will also output low level. At this point, when the signal output terminal VOUT of the last light intensity detection circuit Un is electrically connected with the signal input terminal VIN of the first light intensity detection circuit U1, the signal input terminal VIN of the first light intensity detection circuit U1 still receives low level. Thus, the signal output terminal VOUT of the last light intensity detection circuit Un will always output low level, so the sampling period cannot be determined and the signal output frequency cannot be calculated according to the sampling period by adoption of the acquisition unit 20 to acquire the output signals of the signal output terminal VOUT of the last light intensity detection circuit Un.

In order to solve the above problem, as illustrated in FIG. 7, the light intensity detector 02 comprises n light intensity detection circuits (U1, U2 . . . Un); n≥3, and n is an odd number; the signal output terminal VOUT of the last light intensity detection circuit Un is electrically connected with the signal input terminal VIN of the first light intensity detection circuit U1; and the acquisition unit 20 may include a counter 201, a timer 202 and a processor 203. In this case, the step of adopting the acquisition unit 20 to acquire the frequency of the output signals of the signal output terminal VOUT of the light intensity detection circuit U includes:

Firstly, in the process of inputting high level to the signal input terminal VIN of the first light intensity detection circuit U1 for the first time, the timer 202 as illustrated in FIG. 7 starts timing. When the signal output terminal of the last light intensity detection circuit Un outputs high level, the counter 201 counts once.

For example, as the light intensity detector 02 comprises odd number light intensity detection circuits, when the signal input terminal VIN of the first light intensity detection circuit U1 inputs high level, the signal output terminal VOUT of the last light intensity detection circuit Un outputs low level. As the signal output terminal VOUT of the last light intensity detection circuit Un is electrically connected with the signal input terminal VIN of the first light intensity detection circuit U1, the signal input terminal VIN of the first light intensity detection circuit U1 will input low level. At this point, the signal output terminal VOUT of the last light intensity detection circuit Un outputs high level. On this basis, when the signal output terminal VOUT of the last light intensity detection circuit Un outputs high level, the counter 201 counts once, so as to determine one sampling period.

Secondly, the timer 202 stops timing when the count number of the counter 201 reaches default number.

Wherein, the default number is greater than or equal to 1 and may be set as required, as long as the default number is guaranteed to be greater than or equal to 1. When the default number is set to be large, the time T recorded by the timer 202 is longer. Conversely, the time T recorded by the timer 202 is shorter.

Finally, the processor 203 obtains the frequency of the output signals of the signal output terminal VOUT of the last light intensity detection circuit Un according to the time of the timer 202 and the default number.

For example, the frequency of the output signals of the signal output terminal VOUT of the last light intensity detection circuit Un, calculated by the processor 203, is $f=1/T=1/(2n(t+k))$.

Wherein, f refers to the frequency of the output signals of the signal output terminal VOUT of the last light intensity detection circuit Un; and T refers to the time recorded by the timer 202, namely the period T of the oscillating signals outputted by the signal output terminal VOUT of the last light intensity detection circuit Un.

And t refers to the potential pull-up or pull-down time of the signal output terminals VOUT of the light intensity detection circuits in the light intensity detector 02. As described above, as illustrated in FIG. 6A, when the intensity of light incident into the light intensity detector is higher, t is longer (e.g., t2) and f is lower; and when the intensity of the light incident into the light intensity detector is lower, t is shorter (e.g., t1) and f is higher.

In addition, n refers to the number of the light intensity detection circuits in one light intensity detector 02.

Moreover, k is a constant relevant to the characteristics of the capacitor C, the resistor R and the transistors.

In summary, the present disclosure can obtain the intensity of the light incident into the light intensity detector through the potential pull-up rate of the signal output terminal VOUT of the light intensity detection circuit U, namely the frequency of the output signals thereof.

The foregoing is only the preferred embodiments of the present disclosure and not intended to limit the scope of protection of the present disclosure. The scope of protection of the present disclosure should be defined by the appended claims.

The application claims priority to the Chinese patent application No. 201610877622.1, filed Sep. 30, 2016, the disclosure of which is incorporated herein by reference as part of the application.

The invention claimed is:

1. A light intensity detection circuit, comprising a first reverser, a second reverser, a third reverser, a photosensor and an energy storage element, wherein
    the first reverser is electrically connected with a signal input terminal, a first voltage terminal, a second voltage terminal and the energy storage element of the light intensity detection circuit and configured to respectively output a voltage of the first voltage terminal or the second voltage terminal to the energy storage element under the control of the signal input terminal of the light intensity detection circuit;
    the second reverser is electrically connected with one end of the photosensor, the energy storage element and a ground terminal; the third reverser is electrically connected with the other end of the photosensor, a third voltage terminal and the energy storage element; the second reverser and the third reverser are configured to control transmission of photocurrent generated by the photosensor along a first direction or a second direction, in which the first direction is opposite to the second direction; and
    the energy storage element is further electrically connected with a signal output terminal of the light intensity detection circuit and configured to control a voltage of the signal output terminal of the light intensity detection circuit through voltage storage or voltage release.

2. The light intensity detection circuit according to claim 1, wherein the first reverser includes a first transistor and a second transistor;
    a gate electrode of the first transistor is electrically connected with the signal input terminal of the light intensity detection circuit; a first pole is electrically connected with the first voltage terminal; a second pole is electrically connected with the energy storage element;
    a gate electrode of the second transistor is electrically connected with the signal input terminal of the light intensity detection circuit; a first pole is electrically connected with the second voltage terminal; a second pole is electrically connected with the energy storage element;
    the first transistor is a P-type transistor; and the second transistor is an N-type transistor.

3. The light intensity detection circuit according to claim 1, wherein the second reverser includes a third transistor and a fourth transistor; the photosensor is a photosensitive diode;
    a gate electrode and a first pole of the third transistor are electrically connected with the energy storage element, and a second pole is electrically connected with an anode of the photosensitive diode;
    a gate electrode of the fourth transistor is electrically connected with the energy storage element; a first pole is electrically connected with the ground terminal; a second pole is electrically connected with the anode of the photosensitive diode;
    the third transistor is a P-type transistor; and the fourth transistor is an N-type transistor.

4. The light intensity detection circuit according to claim 1, wherein the third reverser includes a fifth transistor and a sixth transistor; the photosensor is a photosensitive diode;
    a gate electrode and a first pole of the fifth transistor are electrically connected with the energy storage element, and a second pole is electrically connected with a cathode of the photosensitive diode;
    a gate electrode of the sixth transistor is electrically connected with the energy storage element; a first pole is electrically connected with the third voltage terminal; a second pole is electrically connected with the cathode of the photosensitive diode;
    the fifth transistor is an N-type transistor; and the sixth transistor is a P-type transistor.

5. The light intensity detection circuit according to claim 1, wherein the energy storage element includes a capacitor and a resistor;

one end of the capacitor is electrically connected with the signal output terminal of the light intensity detection circuit and the other end of the capacitor is electrically connected with the ground terminal; and one end of the resistor is electrically connected with the first reverser, the second reverser and the third reverser, and the other end is electrically connected with the signal output terminal of the light intensity detection circuit.

6. The light intensity detection circuit according to claim 1, wherein an output voltage of the third voltage terminal is higher than an output voltage of the second voltage terminal.

7. A light intensity detector, comprising n light intensity detection circuits according to claim 1 and an acquisition unit, wherein n≥1 and n is a positive integer;

when n=1, the signal output terminal of the light intensity detection circuit is electrically connected with the acquisition unit, and the acquisition unit is configured to acquire a frequency of output signals of the signal output terminal of the light intensity detection circuit; or when n>1, multiple light intensity detection circuits are in cascade connection; the signal output terminal of the last light intensity detection circuit is electrically connected with the acquisition unit; and the acquisition unit is configured to acquire a frequency of output signals of the signal output terminal of the last light intensity detection circuit.

8. The light intensity detector according to claim 7, wherein the light intensity detector comprises n light intensity detection circuits; n≥3, and n is an odd number; and the signal output terminal of the last light intensity detection circuit is electrically connected with the signal input terminal of the first light intensity detection circuit.

9. The light intensity detector according to claim 8, wherein the acquisition unit includes a counter, a timer and a processor;

the counter is connected with the timer and configured to count a number of the output signals of the signal output terminal of the last light intensity detection circuit;

the timer is further connected with the processor and configured to record a time of the output signals of the signal output terminal of the last light intensity detection circuit according to a counting result of the counter; and the processor is configured to calculate the frequency of the output signals of the signal output terminal of the last light intensity detection circuit according to a recording result of the timer.

10. A display device, comprising the light intensity detector according to claim 7.

11. The display device according to claim 10, further comprising a display panel and a shell for covering a non-display region of the display panel, wherein the light intensity detector is disposed in the non-display region; and a transparent hole is formed at a position of the shell corresponding to the light intensity detector.

12. A method for detecting light intensity via the light intensity detector according to claim 7, comprising:

inputting an initial signal into the signal input terminal of the light intensity detection circuit; and determining a light intensity by adopting the acquisition unit to acquire the frequency of the output signals of the signal output terminal of the light intensity detection circuit.

13. The detection method via the light intensity detector according to claim 12, wherein when the light intensity detector includes n light intensity detection circuits, n≥3, n being an odd number, the signal output terminal of the last light intensity detection circuit being electrically connected with the signal input terminal of the first light intensity detection circuit, the acquisition unit including a counter, a timer and a processor, adopting the acquisition unit to acquire the frequency of the output signals of the signal output terminal of the light intensity detection circuit includes:

allowing the timer to start timing in a case of inputting high level into the signal input terminal of the first light intensity detection circuit for the first time, and allowing the counter to count once when the signal output terminal of the last light intensity detection circuit outputs high level;

allowing the timer to stop timing when a count number of the counter reaches a default number; and allowing the processor to obtain the frequency of the output signals of the signal output terminal of the last light intensity detection circuit according to the time of the timer and the default number.

* * * * *